May 30, 1939. J. R. ZIPAY Re. 21,108

VARIABLE PITCH PROPELLER MECHANISM

Original Filed July 26, 1932

Inventor:

JOHN RAPP ZIPAY,

By: Christian R. Nielsen.

Attorney.

Reissued May 30, 1939 Re. 21,108

UNITED STATES PATENT OFFICE 21,108

VARIABLE PITCH PROPELLER MECHANISM

John Rapp Zipay, Pittsburgh, Pa.

Original No. 1,998,152, dated April 16, 1935, Serial No. 624,743, July 26, 1932. Application for reissue October 12, 1936, Serial No. 105,350

5 Claims. (Cl. 170—163)

This invention relates to variable pitch propellers and its consists in the constructions, arrangements and combinations herein described and claimed.

In variable pitch propellers for aeroplane and like uses the stems of the propeller blades are usually journalled in the bores of the propeller bushing, which bushing is mounted on and disposed transversely of the propeller shaft.

Means are usually provided whereby the pitch of the propeller blades is automatically increased with the speed of rotation of the propeller, the increase of pitch with the increasing speed of rotation being produced by the use of centrifugally acting weights which revolve with the propeller or levers extending radially of the stems of the propeller blades and thus the weights increase the air-resistance to the rotation of the propeller, and wherever located the weights tend to destroy the balance of the propeller mechanism.

One of the objects which I have in view is to provide for the automatic control of the variation in propeller blade pitch in accordance with the speed of rotation without the use of weights or other like means which tend to impair or destroy the balance or which increase the air-resistance.

For the purpose I employ the pressure of the forced feed of oil to the motor of the aeroplane or other air craft.

In motors used for this purpose the oil is supplied under pressure to the bearings and their moving parts by an oil pump which is driven from the motor, the pump pressure increasing with the speed of the motor and consequently with the speed of rotation of the propeller.

In my invention as the oil pump pressure increases with the speed of rotation of the propeller the pitch of the propeller blades is automatically increased and, likewise, as the speed of the motor and consequently the speed of rotation of the propeller and also the pressure of the oil decreases the pitch of the propeller blades is likewise decreased.

I provide means whereby both the minimum and the maximum pitch of the propeller blades may be adjusted so that the greatest efficiency may be obtained.

Again I provide means whereby the operator in the cockpit or control car of the aircraft may at will throw the automatic pitch varying means into and out of operation while in flight.

Other novel features of construction and of arrangement of parts will appear from the following description.

In the accompanying drawing wherein I have illustrated a practical embodiment of the principles of my invention, Figure 1 is a broken plan view partially in horizontal section along the line 1—1 of Figure 2, showing the front end of the propeller shaft of an aeroplane, the partible propeller hub and the propeller blades having their stems journalled in the bores of the hub.

Figure 1:
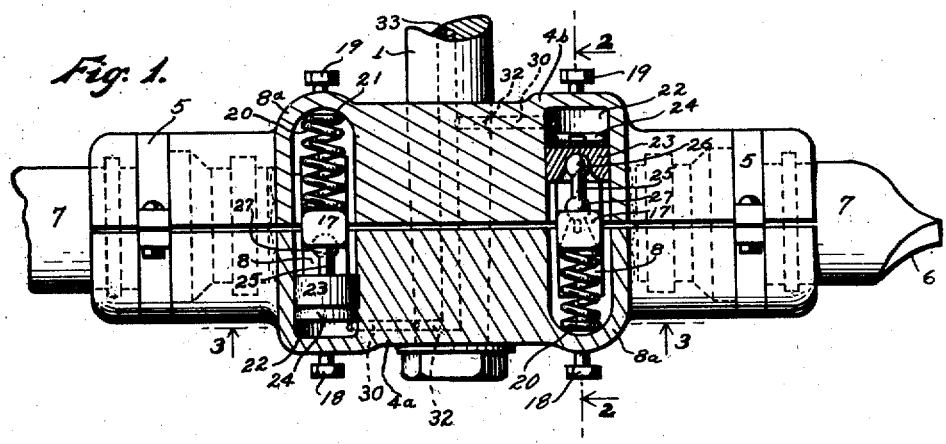
Figure 2:
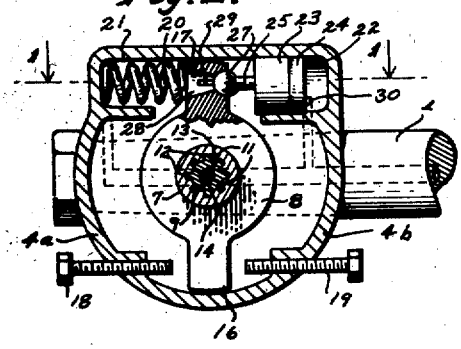
Figure 2 is a vertical cross section along the line 2—2 in Figure 1.
Figure 3:
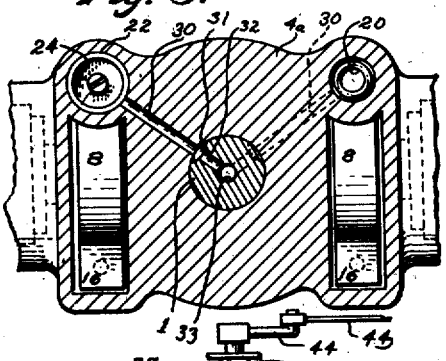
Figure 3 is a vertical section along the line 3—3 in Figure 1.
Figure 4:
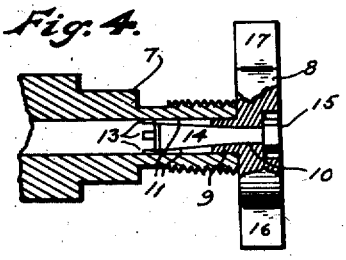
Figure 4 is a detail partially in section of one of the head members secured to one of the propeller blade stems.
Figure 5:
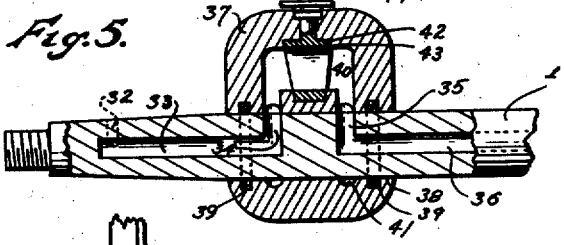
Figure 5 is a detail in section showing the manually operated control valve.
Figure 6:
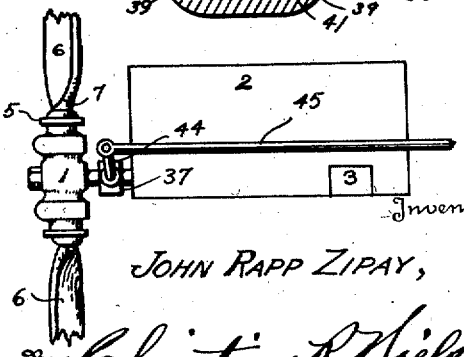
Figure 6 is a diagrammatic view showing the motor, the oil pump, and the propeller of an aeroplane.

Referring to the drawing, 1 represents the propeller shaft which is driven by the motor 2, and the motor also drives the oil pump 3 which supplies oil under pressure to the moving parts.

The partible propeller hub shown at 4a—4b is fixed on and disposed transversely to the shaft 1, the bushing parts being held together as by the clamping bands 5.

6 represents the propeller blades whose stems 7 are journalled in the bore of the propeller hub.

8 represents heads which are provided with integrally and axially disposed tubular necks 9 which have central axial openings 10 contracting in diameter from the outer ends of the necks and extending through the heads 8. The necks are split longitudinally as illustrated at 11, four of said splits equally distant apart being shown.

The necks 9 are inserted in the ends of the stems 7 and the necks are provided with an annularly arranged series of longitudinally disposed ribs 12 which mate with slots 13 cut in the bores of the stems to prevent relative rotary movement between the stems and the heads.

14 represents tapered bolts fitting the openings of the necks 9 so that when the necks have been inserted into the stems with the heads bearing against or adjacent to the ends of the stems, nuts 15 may be screwed up tight on the threaded ends of the bolts 14 against the heads, thus wedging the split necks into fixed engagement with the stems and the corresponding head will rotate in unison.

Suitable locks are applied to the nuts 15 to prevent them from loosening.

Each of the heads 8 is provided with a pair of radially extending and preferably diametrically opposed fingers 16 and 17. The hub is circumferentially enlarged as at 8a to provide clearance for the heads 8 and the fingers 16 and 17.

18 and 19 represent opposed abutment bolts screwed through threaded holes in the wall of the hub and with their inner ends disposed at either side of the lower finger 16 of each of the heads. By adjusting the bolts the head may be permitted the desired arc of rotary movement and consequently the degree of pitch variation.

Thus by adjusting the bolt 18 the minimum pitch of the corresponding propeller blade may be regulated and likewise the bolt 19 determines the maximum pitch of the blade.

20 represents a helical spring mounted in a socket 21 formed in the wall of the hub and the inner end of said spring bears against the finger 17. This spring is arranged so that it tends to rotate the head 8 to reduce the pitch of the corresponding propeller blade to the minimum determined by the adjustment of the bolt 18.

22 represents a cylinder also formed in the wall of the hub at each enlargement 8a and opposed to the corresponding spring socket 21. The outer ends of each of the cylinders are closed and 23 represents a piston working in the cylinder and provided with a suitable packing such as the expanding cup 24.

25 represents a piston rod having one end provided with a ball 26 which is received in a cup socket in the inner end of the piston while the other end of the rod is provided with a second ball 27 which is seated in a similar socket in the finger 17.

28 is an outwardly flaring hole extending from the socket through the finger and 29 is an extension of the rod working in the said hole, thus preventing the rod from dropping out of place while permitting its flexible action between the piston and the finger.

As may be seen in Figure 1, the arrangement of the spring and the piston is reversed in the case of the two propeller stems. The closed ends of the two cylinders 22 are connected by passages 30, preferably formed in the walls of the hub parts with longitudinal grooves 31 cut in the perimetral surface of the shaft 1, and said grooves are connected by radially disposed passages 32 in the shaft with the longitudinal passage 33 at the axis of the shaft. The outer end of said passage 33 is closed.

The passage 33 extends rearwardly in said shaft for a short distance and then ends or is blocked. 34 is a radial passage formed in the shaft and connected at its inner end with the passage 33. A short distance in the rear of the passage 34 said shaft is provided with a second radial passage 35 which connects at its inner end with a second axial passage 36 whose rear end is connected with the oil pressure system of the motor.

37 represents a valve casing which is fixed. For instance, it may be mounted on a portion of the motor frame. The casing is provided with a horizontal bore 38 through which the shaft 1 extends, packing rings or gaskets 39 being employed to prevent the escape of oil from the valve casing along the shaft in either direction.

The casing 37 is provided with a horizontal passage 40 having its ends connected by vertical portions with annular grooves 41 cut in the wall of the bore 37 and registering respectively with the radial passages 34 and 35 in the shaft.

42 represents a valve plug seated in a valve seat 43 which intersects the passage 40, so that the oil pressure may be admitted to the cylinders 22, be cut off therefrom, or by a partial closing of the valve the oil pressure effective at said cylinders may be regulated.

The valve plug 42 is preferably operated from the cockpit or control station of the aeroplane or other aircraft. Thus I have indicated the valve plug provided with a crank 44 and the lever 45 extending rearwardly past the motor 2 so that the operator may open or close or regulate the valve while the aeroplane is in flight.

It is obvious that as the speed of rotation increases with the increasing speed of the motor, the oil pressure effective in the cylinders 22 will increase, thus increasing the pitch of the propeller blades, the springs 20 being compressed. Likewise as the speed of rotation of the propeller decreases with the decrease of the speed of the motor, the oil pressure effective in said cylinders will decrease and the pitch of the propeller blades will correspondingly decrease owing to the expansion of the springs 20.

By means of the abutment bolts 18 and 19 the minimum pitch and the maximum pitch may be adjusted to obtain the desired effects.

By means of the manually operated valve in the pressure supply passage, the oil pressure may be cut off from the cylinders 22 for taking off and/or for landing and by the adjustment of the valve any desired pressure may be rendered effective in said cylinders.

It is obvious that my invention may be used in connection with any suitable manual control of the pitch.

It is well known that aeroplane propellers of the adjustable type tend to "lose pitch" by reason of centrifugal force developed within the propeller blades, producing a torque on the axis of the blade while in operation, which tends to cause them to move toward a low pitch position. Therefore it may be said that my springs 20 assist or augment this force.

The cylinder 22 may be termed a fluid container, and the piston operates therein in response to increase and decrease of fluid in this container.

In addition to the adjustable stops 18 and 19 for limiting the range of movement of the pitch variation, it will be noted that the end of the cylinder 22, and the end of the socket for the spring 20 are positioned so as to constitute permanent positive stops effective with the finger 17.

I claim:

1. In variable speed propeller mechanism for aeroplane and the like uses, the combination with a motor provided with an oil supply under pressure which varies with the speed of the motor, a shaft driven by said motor and provided with a longitudinally disposed oil passage in communication with the oil supply, a hub fixed on and disposed transversely to said shaft, the ends of said hub being provided with bores, propeller blades having stems journalled in said bores and arranged for rotation relative to the hub to vary the pitch of said blades, a cylinder in said hub adjacent each of said bores and communicating with the latter, the outer ends of each of said cylinders being connected by a passage in the hub communicating with the shaft passage, pistons working in said cylinders and provided with piston rods, a radially disposed finger carried by each of said stems and engaged by the piston rod of the corresponding piston, the arrangement being such that as the oil pressure increases with the increasing speed of the motor the stems are rotated to increase the pitch of the blades, and means for automatically decreasing the blade pitch as the oil pressure decreases.

2. In variable speed propeller mechanism for aeroplane and the like uses, the combination with a motor provided with an oil supply under pressure which varies with the speed of the motor, a shaft driven by said motor and provided with a longitudinally disposed oil passage in communication with the oil supply, a hub fixed on and disposed transversely to said shaft, the ends of said hub being provided with bores, propeller blades having stems journalled in said bores and arranged for rotation relative to the hub to vary the pitch of said blades, a cylinder in said hub adjacent each of said bores and communicating with the latter, the outer ends of each of said cylinders being connected by a passage in the hub communicating with the shaft passage, pistons working in said cylinders and provided with piston rods, a radially disposed finger carried by each of said stems and engaged by the piston rod of the corresponding piston, the arrangement being such that as the oil pressure increases with the increasing speed of the motor the stems are rotated to increase the pitch of the blades, and a spring working against each of said fingers and opposed to the corresponding piston whereby to decrease the blade pitch as the oil pressure decreases.

3. In variable speed propeller mechanism for aeroplane and the like uses, the combination with a motor provided with an oil supply under pressure which varies with the speed of the motor, a shaft driven by said motor and provided with a longitudinally disposed oil passage in communication with the oil supply, a hub fixed on and disposed transversely to said shaft, the ends of said hub being provided with boxes, propeller blades having stems journalled in said bores and arranged for rotation relative to the hub to vary the pitch of said blades, a cylinder in said hub adjacent each of said bores and communicating with the latter, the outer ends of each of said cylinders being connected by a passage in the hub communicating with the shaft passage, pistons working in said cylinders and provided with piston rods, a radially disposed finger carried by each of said stems and engaged by the piston rod of the corresponding piston, the arrangement being such that as the oil pressure increases with the increasing speed of the motor the stems are rotated to increase the pitch of the blades, means for automatically decreasing the blade pitch as the oil pressure decreases, and means for regulating the oil pressure effective against the pistons.

4. In variable speed propeller mechanism for aeroplane and like uses, the combination with a motor provided with an oil supply under pressure which varies with the speed of the motor, a shaft driven by said motor and provided with a longitudinally disposed oil passage in communication with the oil supply, a hub fixed on and disposed transversely to said shaft, the ends of said hub being provided with bores, propeller blades having stems journalled in said bores and arranged for rotation relative to the hub to vary the pitch of said blades, a cylinder in said hub adjacent each of said bores and communicating with the latter, the outer ends of each of said cylinders being connected by a passage in the hub communicating with the shaft passage, pistons working in said cylinders and provided with piston rods, a radially disposed finger carried by each of said stems and engaged by the piston rod of the corresponding piston, the arrangement being such that as the oil pressure increases with the increasing speed of the motor the stems are rotated to increase the pitch of the blades, means for automatically decreasing the blade pitch as the oil pressure decreases, and means for limiting the increase of the blade pitch in response to increasing oil pressure.

5. In variable speed propeller mechanism for aeroplane and like uses, the combination with a motor provided with an oil supply under pressure which varies with the speed of the motor, a shaft driven by said motor and provided with a longitudinally disposed oil passage in communication with the oil supply, a hub fixed on and disposed transversely to said shaft, the ends of said hub being provided with bores, propeller blades having stems journalled in said bores and arranged for rotation relative to the hub to vary the pitch of said blades, a cylinder in said hub adjacent each of said bores and communicating with the latter, the outer ends of each of said cylinders being connected by a passage in the hub communicating with the shaft passage, pistons working in said cylinders and provided with piston rods, a radially disposed finger carried by each of said stems and engaged by the piston rod of the corresponding piston, the arrangement being such that as the oil pressure increases with the increasing pitch of the motor the stems are rotated to increase the pitch of the blades, means for automatically decreasing the blade pitch as the oil pressure decreases, means for limiting the increase of the blade pitch in response to increasing oil pressure, and means for varying the minimum pitch of the blade.

JOHN RAPP ZIPAY.